(12) United States Patent
Colwell

(10) Patent No.: US 7,699,896 B1
(45) Date of Patent: Apr. 20, 2010

(54) SURFACE PRETREATMENT OF FABRICS FOR LASER WRITING APPLICATIONS

(75) Inventor: Heath Colwell, Reading, MI (US)

(73) Assignee: Technolines, LLC, Westlake, OH (US)

( * ) Notice: Subject to any disclaimer, the term of this patent is extended or adjusted under 35 U.S.C. 154(b) by 1132 days.

(21) Appl. No.: 11/280,973

(22) Filed: Nov. 14, 2005

Related U.S. Application Data

(60) Provisional application No. 60/628,311, filed on Nov. 16, 2004, provisional application No. 60/662,469, filed on Mar. 17, 2005.

(51) Int. Cl.
*C08J 7/18* (2006.01)
*B05D 3/00* (2006.01)

(52) U.S. Cl. .................. 8/115.52; 8/115.51; 8/116.1; 427/457; 427/554; 427/532; 427/553; 216/65

(58) Field of Classification Search ............... 8/115.51, 8/491, 493, 494, 499
See application file for complete search history.

(56) References Cited

U.S. PATENT DOCUMENTS

| | | | | |
|---|---|---|---|---|
| 4,090,844 A * | 5/1978 | Rowland | .................. | 8/120 |
| 5,366,591 A * | 11/1994 | Jewell | .................. | 162/9 |
| 5,522,317 A * | 6/1996 | Hale et al. | .................. | 101/488 |
| 5,567,207 A * | 10/1996 | Lockman et al. | .................. | 8/444 |
| 5,614,591 A * | 3/1997 | Basinger et al. | .................. | 525/163 |
| 6,252,196 B1 * | 6/2001 | Costin et al. | .................. | 219/121.69 |
| 6,495,237 B1 * | 12/2002 | Costin | .................. | 428/116 |
| 7,318,377 B2 * | 1/2008 | Espy et al. | .................. | 101/129 |

* cited by examiner

*Primary Examiner*—Harold Y Pyon
*Assistant Examiner*—Katie Hammer
(74) *Attorney, Agent, or Firm*—Berenato & White, LLC

(57) ABSTRACT

Pretreatment of a fabric using a material that binds to the fabric and changes some characteristic of the fabric. In an embodiment, the characteristic that is changed can be at least one of stain and flash for wrinkle resistance. The material can be Permafresh material. The material can bind to the fabric, and intends to be maintained within the fabric for the life of the fabric. After pretreatment, the pretreated material is processed by a laser which intends to change the look of the material without undesirably damaging the material. The treatment may make the treatment by lasers more consistent and allow the lazed graphic to maintain its quality after repeated washings and wearing.

19 Claims, 2 Drawing Sheets

SURFACE PRETREATMENT OF FABRICS FOR LASER WRITING APPLICATIONS

CROSS REFERENCE TO RELATED APPLICATIONS

The present application claims priority from provisional application Nos. 60/628,311, filed Nov. 16, 2004, and 60/662,469, filed Mar. 17, 2005, the contents of both of which are herewith incorporated by reference.

BACKGROUND

Technolines LLC has been granted a number of patents, including U.S. Pat. No. 5,990,444 and others, which describe lasers being used to write graphic images and patterns on substrates. The lasers may write graphic images on fabric substrates such as cotton, polyester, suede, leather, and the like. The laser should write with an output power or energy "density" per unit time, or EDPUT, that makes a mark on the fabric, without undesirable damage to the fabric.

SUMMARY

The present application describes a technique of treating fabrics prior to and/or after marking them with a laser. The treatment allows the laser to make a better sustainable mark on the fabric (specifically after repeated washes or wear).

According to a first aspect of the invention, a method of producing a sustainable laser-scribed graphic image on a cotton garment is provided. The cotton garment contains a dye imparting an appearance of a first color other than white to the cotton garment. An area but less than all of the cotton garment is pre-treated with a curable pre-treatment material, and the pre-treatment material on the pre-treated area of the cotton garment is cured. A laser scribes a graphic image in the pre-treated area, the graphic image having a second color sufficiently different in appearance from the first color to establish a visibly perceivable contrast between the first and second colors. The cured pre-treatment material improves sustainability of the visibly perceivable contrast against repeated washings.

According to a second aspect of the invention, a method of producing a sustainable laser-scribed graphic image on a cotton garment is provided. The cotton garment contains a dye imparting an appearance of a first color other than white to the cotton garment. A graphic image is laser scribed in an area of the cotton garment, the graphic image having a second color sufficiently different in appearance from the first color to establish a visibly perceivable contrast between the first and second colors. The lazed portion but less than all of the cotton garment is treated with a curable treatment material, and the treatment material is cured. The cured treatment material improves sustainability of the visibly perceivable contrast against repeated washings.

DETAILED DESCRIPTION

The general structure and techniques, and more specific embodiments which can be used to effect different ways of carrying out the more general goals are described herein.

Figure 1:
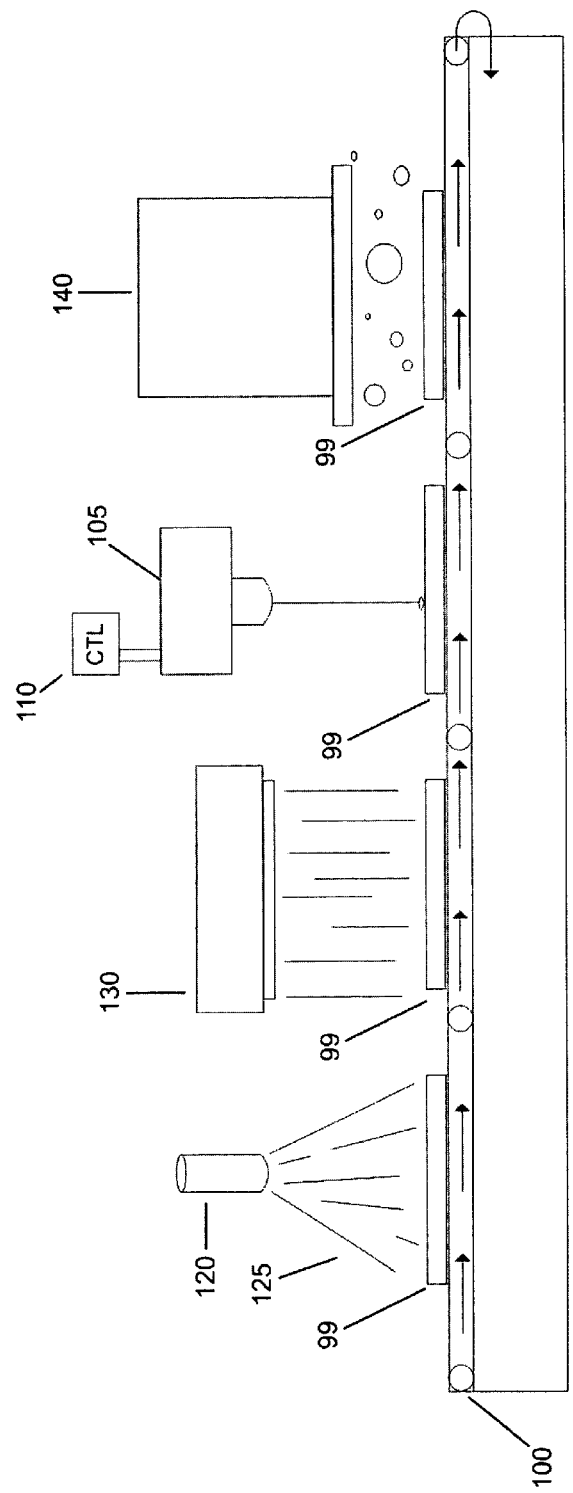
FIGS. 1 and 2 show embodiments of the system with a pretreatment, and laser marking part.
Figure 2:
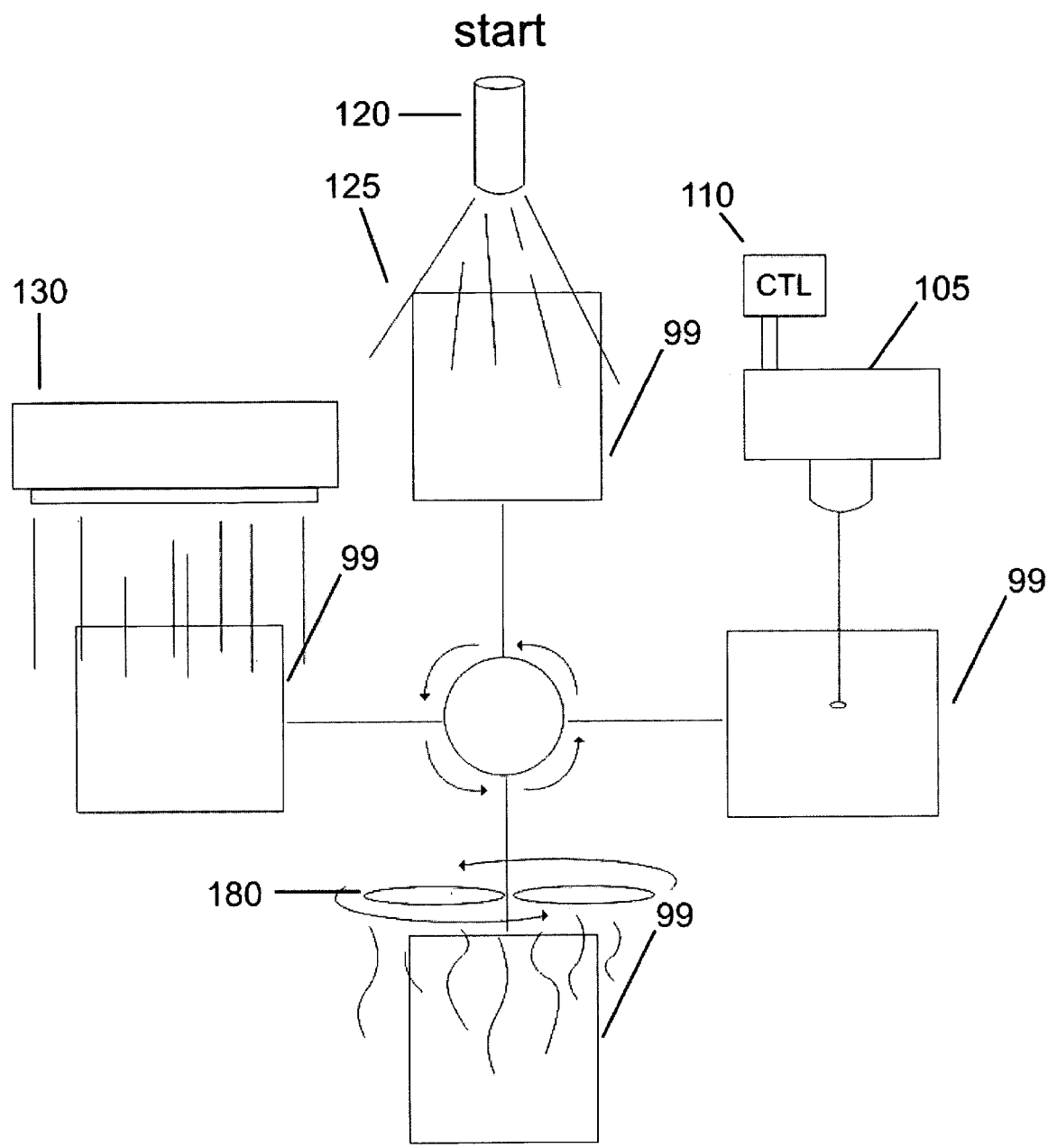

A basic embodiment is shown in FIG. 1. FIG. 1 shows the operation along a conveyor 100, however, it should be understood that the operation can be carried out in one place, or as part of any other kind of workstation. A workpiece, e.g., a fabric item, or clothing part, shown as 99, is exposed to the output of a laser 105. A controller 110 controls the laser. The controller may be internal to the laser 105 or may be completely separate. The controller causes the laser to output a beam which has an energy amount that causes a change to the look of the fabric. The energy amount may be set as an energy density per unit time, which may avoid undesirable damage to the fabric and may alter the fabric chemistry. The controller, for example, may be a computer that is controlled according to a prestored program. The program may include an image of a design to be scribed. The design may be image portions representing words, or may be image portions representing an actual image, such as a logo. The computers described herein may be any kind of computer, either general purpose, or some specific purpose computer such as a workstation. The computer may be a Pentium class computer, running Windows XP or Linux, or may be a Macintosh computer. The programs may be written in C, or Java, or any other programming language. The programs may be resident on a storage medium, e.g., magnetic or optical, e.g. the computer hard drive, a removable disk or other removable medium. The programs may also be run over a network. FIG. 2 illustrates the incorporation of the invention in a typical screen printing carousel operation. For those skilled in the art, it is apparent that the traditional multiple arms which apply different colored paints to the fabric via individual screen printing, can be situated anywhere along the carousel shown in FIG. 2.

It has been observed that most textile substrates are very responsive to the laser writing process. After the textile is processed by the laser, it is desirable that the image that was written during the operation should be seen immediately, and that the image is also seen later—e.g., after wearing or washing. However, on certain garments, and specifically on some cotton materials, the graphic has been observed to disappear or reduce in contrast after washing. The kinds of materials, and the reasons why this happens are unknown. The materials and results have not been easily susceptible of prediction.

For example, this problem could exist on one specific dyed cotton material. However, the problem might not exist on a similar dyed cotton material of the same color. Some colors tend to produce better laser-scribed graphics than others. There has been minimal consistency between the processes. For example, scribed graphics on blue and red cottons have tended to look better after washing then the same graphics lazed on black or pink cottons.

It is postulated that variations in the yarn, weaving, dyes, retention techniques or other material variation might be responsible for the inconsistent problem. However, this problem prevented laser scribed graphics from being used on all dyed fabrics; while also withstanding repeated washing.

The inventor believed that there must be some spray or surface treatment which could change the characteristics of the material, here cotton, to allow the scribed graphics to withstand repeated washings. A variety of different surface treatments were investigated. A specific product called PermaFresh® (a modified compound of DMDHEU: dimethyloldihydroxy-ethyleneurea) was found from a chemical company called Omnova. The PermaFresh product is a total fabric treatment for stain and wrinkle resistance. This treatment is meant to remain bound to the fabric for the life of the fabric, and to withstand washing.

Permafresh surprisingly proved to essentially eliminate the post wash characteristic problem when processing laser scribed graphics on many different dyed materials and colors. Other analogous materials may also be used, which will have similar results.

The PermaFresh compound is applied, and heat cured, to alter the surface chemistry of the material in some way. Element 120 illustrates the fabric pretreatment process, where the sprayer 120 sprays the material 125 on to the workpiece 99 prior to laser scribing. The heat curing may be a totally separate step along the conveyor, or may rely on the heat produced by the laser 105 itself. This allows the laser-written graphics to appear crisp and clean even after repeated washings. This also made it possible, and also facilitates the laser writing of the graphics on certain cotton colors such as black and pink. Laser writing on black and pink has historically been difficult or impossible prior to this pretreatment technique.

A post treatment step 130 applies a post treatment material on to the workpiece. The post treatment may simply be for example from the heat flow, or may be either another wrinkle resistance material or the same wrinkle resistance material. Heat may serve to further fix the wrinkle resistant material in place. Typically the heat application is applied after the spaying operation and before the lazing operation. An additional post treatment as in step 180 in FIG. 2 could actually cool the spayed and heated material.

The conveyor may also include a washing station shown as 140. Washing station 140 may apply soap, using brushes as shown, and may vacuum away the soap residue, and/or may also provide a rinse operation to the material after the soap has been applied or may only provide a rinse function. Alternatively, a more conventional washing machine can be used, instead of doing this along the conveyor. The washing operation would be carried out after all laser marking and heating steps are complete.

While PermaFresh has been described as the one pretreatment material, it should be understood that any treatment process that remains bound to the fabric for the life of the garment may be able to be similarly used. More specifically, any such treatment product which provides stain and/or wrinkle resistance and/or other kind of treatment to the material which changes the characteristic of the material, may be used. It may be postulated that the stain protection somehow chemically alters the surface to allow it to retain the laser formed image after washing. The pretreatment that is used should preferably be liquid, it should preferably remain bound to the fabric for either the life of the fabric or at least for a number of washing cycles of the fabric, and it should at least in one embodiment, have the function of at least one of wrinkle and/or stain resistance.

A method comprising treating a fabric material with a treatment that remains bound to the fabric and is intended to change some characteristic of the fabric to make the fabric more resistant and using a laser to form a perceivable change to a color of the fabric without undesirably damaging the fabric.

Although only a few embodiments have been disclosed in detail above, other embodiments are possible and the inventor(s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other materials, that is, other than Permafresh may be used. An important part of the material is that it alters the characteristic of the fabric, and in a specific way. The fabric's characteristic should be altered in a way that makes it more resistant. Wrinkle resistance and stain resistance are two exemplary ways in which the characteristic should be altered.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

What is claimed is:

1. A method of producing a sustainable laser-scribed graphic image on a cotton garment, comprising:
   providing a cotton garment containing a dye imparting an appearance of a first color other than white to the cotton garment;
   selecting an area of the dyed cotton garment comprising less than the entire area of the cotton garment where an image is to be formed pre-treating said area but less than all of the cotton garment by spraying said area with a curable pre-treatment material;
   curing the pre-treatment material on said pre-treated area of the cotton garment; and
   laser scribing a graphic image in the pre-treated area, the graphic image having a second color sufficiently different in appearance from the first color to establish a visibly perceivable contrast between the first and second colors,
   wherein the cured pre-treatment material improves sustainability of the visibly perceivable contrast against repeated washings.

2. The method of claim 1, wherein the cured pre-treatment material provides stain resistance to the cotton garment.

3. The method of claim 1, wherein the cured pre-treatment material provides wrinkle resistance to the cotton garment.

4. The method of claim 1, wherein the curable pre-treatment material comprises a liquid.

5. The method of claim 1, wherein the curable pre-treatment material comprises a modified dimethylol-dihydroxyethylene urea.

6. The method of claim 1, wherein the cured pre-treatment material chemically alters a surface of the pre-treated area of the cotton garment.

7. The method of claim 1, wherein said pre-treating comprises spraying the curable pre-treatment material on the pre-treated area of the cotton garment.

8. The method of claim 1, wherein said curing comprises applying heat to the curable pre-treatment material.

9. The method of claim 1, wherein said laser scribing comprises producing a laser output having an energy density per unit time that scribes the graphic image without the cotton garment.

10. The method of claim 1, further comprising cooling the cotton garment subsequent to said laser scribing.

11. A method of producing a sustainable laser-scribed graphic image on a cotton garment, comprising:
    providing a cotton garment containing a dye imparting an appearance of a first color other than white to the cotton garment;
    laser scribing a graphic image in an area of the cotton garment, the graphic image having a second color sufficiently different in appearance from the first color to establish a visibly perceivable contrast between the first and second colors,
    spraying said area but less than all of the cotton garment with a modified dimethylol-dihydroxy-ethylene urea; and
    curing the treatment material on said treated area of the cotton garment;

wherein the cured treatment material improves sustainability of the visibly perceivable contrast against repeated washings.

12. The method of claim 11, wherein the cured treatment material provides stain resistance to the cotton garment.

13. The method of claim 11, wherein the cured treatment material provides wrinkle resistance to the cotton garment.

14. The method of claim 11, wherein the curable treatment material comprises a liquid.

15. The method of claim 11, wherein the cured treatment material chemically alters the treated area of the cotton garment.

16. The method of claim 11, wherein said treating comprises spraying the curable treatment material on the portion of the cotton garment.

17. The method of claim 11, wherein said curing comprises applying heat to the curable treatment material.

18. The method of claim 11, wherein said laser scribing comprises producing a laser output having an energy density per unit time that scribes the graphic image without damaging the cotton garment.

19. The method of claim 11, further comprising cooling the cotton garment subsequent to said curing of the treatment material.

* * * * *